United States Patent
Euripedes da Silva et al.

(10) Patent No.: US 11,919,094 B2
(45) Date of Patent: Mar. 5, 2024

(54) MODULAR DRILL APPARATUS WITH CUTTING TIP IN SITU INSERT ASSEMBLY

(71) Applicant: Kennametal Inc., Latrobe, PA (US)

(72) Inventors: Marcelo Euripedes da Silva, Piracicaba (BR); Ruy Frota de Souza Filho, Latrobe, PA (US)

(73) Assignee: KENNAMETAL INC., Latrobe, PA (US)

(*) Notice: Subject to any disclaimer, the term of this patent is extended or adjusted under 35 U.S.C. 154(b) by 0 days.

(21) Appl. No.: 17/380,734

(22) Filed: Jul. 20, 2021

(65) Prior Publication Data
US 2023/0022019 A1    Jan. 26, 2023

(51) Int. Cl.
*B23B 51/00* (2006.01)

(52) U.S. Cl.
CPC .......... *B23B 51/00* (2013.01); *B23B 51/0003* (2022.01); *B23B 51/0004* (2022.01); *B23B 2251/02* (2013.01); *B23B 2251/50* (2013.01)

(58) Field of Classification Search
CPC ............ B23B 51/0002; B23B 51/0003; B23B 2251/02; B23B 2251/50; B23B 51/0004; B23B 51/0005; B23B 2240/32; B23B 2240/00; B23C 2210/02; B23C 2270/08; B23C 2240/24
See application file for complete search history.

(56) References Cited

U.S. PATENT DOCUMENTS

| | | | |
|---|---|---|---|
| 4,950,108 A * | 8/1990 | Roos | B23B 51/02 408/230 |
| 5,154,549 A * | 10/1992 | Isobe | B23B 51/02 407/50 |
| 5,399,051 A | 3/1995 | Aken et al. | |
| 5,452,971 A | 9/1995 | Nevills | |
| 5,904,455 A | 5/1999 | Krenzer et al. | |
| 6,012,881 A | 1/2000 | Scheer | |
| 6,109,841 A | 8/2000 | Johne | |

(Continued)

FOREIGN PATENT DOCUMENTS

| | | | |
|---|---|---|---|
| DE | 10307213 A1 * | 9/2004 | ............. B23B 51/02 |
| DE | 202011050277 | 8/2012 | |

(Continued)

OTHER PUBLICATIONS

May 22, 2023 Foreign Office Action German Application No. DE102022117852.8, 10 Pages.

*Primary Examiner* — Alan Snyder
*Assistant Examiner* — Reinaldo A Vargas Del Rio
(74) *Attorney, Agent, or Firm* — Christopher J. Owens

(57) ABSTRACT

A modular drill apparatus (100) includes: a shank (110) having a pocket (112); a cylindrical post (117) centrally secured within a bottom (114) of the pocket (112); a cutting tip (130) including a lower portion (131) including a central bore (136) which receives the cylindrical post (117), an upper portion (132) and a channel (134) therebetween; and an insert assembly (150) interfitted within and supported by the channel (134), the insert assembly (150) being expandable along a length thereof for securing the cutting tip (130) to the shank (110) within the pocket (112) by providing an interference fit and retractable along the length thereof for releasing the cutting tip (130) from the pocket (112) by overcoming the interference fit.

27 Claims, 8 Drawing Sheets

(56) References Cited

U.S. PATENT DOCUMENTS

| | | | |
|---|---|---|---|
| 6,695,551 B2 * | 2/2004 | Silver | B23B 51/02 408/230 |
| 7,070,367 B2 | 7/2006 | Krenzer | |
| 7,377,730 B2 | 5/2008 | Hecht et al. | |
| 7,467,915 B2 | 12/2008 | de Souza, Filho | |
| 7,972,094 B2 | 7/2011 | Men et al. | |
| 8,449,227 B2 | 5/2013 | Danielsson | |
| 8,784,018 B2 | 7/2014 | Pábel | |
| 8,840,347 B2 | 9/2014 | Aare | |
| 8,926,237 B2 * | 1/2015 | Fang | B23B 27/16 408/231 |
| 8,992,143 B2 | 3/2015 | Glimpel et al. | |
| 9,108,251 B2 | 8/2015 | Craig | |
| 9,205,498 B2 | 12/2015 | Jaeger | |
| 10,207,337 B2 * | 2/2019 | Frota de Souza Filho | B23B 51/02 |
| 10,213,845 B2 | 2/2019 | Schwaegerl et al. | |
| 11,097,360 B2 * | 8/2021 | Rebholz | B23B 51/08 |
| 2002/0139587 A1 | 10/2002 | Mast et al. | |
| 2002/0159851 A1 | 10/2002 | Krenzer | |
| 2005/0260046 A1 | 11/2005 | Hecht et al. | |
| 2008/0193237 A1 | 8/2008 | Men et al. | |
| 2010/0322723 A1 | 12/2010 | Danielsson | |
| 2010/0322727 A1 | 12/2010 | Pabel | |
| 2010/0322728 A1 | 12/2010 | Aare | |
| 2011/0110739 A1 | 5/2011 | Frisendahl | |
| 2012/0003056 A1 | 1/2012 | Jaeger | |
| 2012/0014760 A1 | 1/2012 | Bernhard et al. | |
| 2014/0154023 A1 | 6/2014 | Craig | |
| 2015/0360300 A1 | 12/2015 | Hecht | |
| 2017/0028480 A1 | 2/2017 | Schwägerl et al. | |
| 2018/0169771 A1 | 6/2018 | Frota De Souza Filho et al. | |
| 2019/0126361 A1 | 5/2019 | Hecht et al. | |
| 2020/0180047 A1 | 6/2020 | Jager et al. | |

FOREIGN PATENT DOCUMENTS

| | | | |
|---|---|---|---|
| KR | 100649359 B1 * | 11/2006 | |
| WO | WO-2018122592 A1 * | 7/2018 | B23B 51/02 |

* cited by examiner

MODULAR DRILL APPARATUS WITH CUTTING TIP IN SITU INSERT ASSEMBLY

FIELD OF THE INVENTION

The present invention involves rotatable cutting tools, and more particularly relates to an enhanced modular drill apparatus having a cutting tip, a shank and an insert assembly (supported within the cutting tip) which is manually expandable/retractable for providing/disengaging a compression fit coupling of the cutting tip with the shank.

BACKGROUND INFORMATION

A great variety of drills with replaceable cutting tips (or cutting inserts) are known conventionally. Illustrative examples may be appreciated via U.S. Pat. Nos. 7,309,196 and 7,467,915 to Frota de Souza, Filho, and U.S. Pat. No. 9,205,498 to Jaeger. Such drills involve replaceable cutting heads which are mounted on shanks. Typically, though by no means exclusively, the cutting heads and shanks can display continuous and complementing configuration as fluted drills. Each shank will often include a structure for retaining and rotating an associated cutting head, while the associated cutting head will have a complementing structure for being retained and rotated by the shank.

Often, challenges are encountered conventionally with respect to deformation and failure during the service life of a drill, due (at least in part) to a concentration of stresses imposed on the retaining and drive structure of the shank during ordinary service. This may unduly limit the useful service life of the drill, thus relevant improvements and modifications continue to be sought that might help mitigate the effect of known problems and constraints.

It would be helpful to be able to provide an enhanced modular drill apparatus in which the coupling mechanism for securing the cutting tip to the shank is improved in its stability against forces associated with cutting operations or other uses or maintenance of the drill.

It would be helpful for drills with replaceable cutting tips and shanks (or other holders) to be able to reduce the stress in the cutting tip and in the shank (or other holder) to increase the tool life.

It would be helpful to be able to eliminate the often encountered circumstance of having to remove the modular drill from the machine with which it is being used to replace the cutting tip.

SUMMARY OF THE INVENTION

Cutting tools and cutting tool assemblies are provided that include a shank (or other rotatable holder or like structure), a cutting tip positioned within a pocket of the shank and supported by sidewalls (or other interior structures) of the pocket, and an insert assembly (or insert) interfitted within (and supported by) a channel through the cutting tip. The insert assembly can be longitudinally expandable/retractable in respect to the channel (i.e., expandable/retractable along the channel or in parallel with a path, such as a channel axis, defined by and/or associated with the channel). An insert assembly can include (or consist of) a pair of coupling elements including/defining a threaded interface therebetween. An insert assembly can include at least one or multiple coupling elements, for example, a first (anchoring) element which is rotationally fixed in relation to and longitudinally slidable within the channel along the channel axis and a second (adjusting) element which is rotationally repositionable in relation to and longitudinally slidable within the channel along the channel axis responsive to manually repositioning a head structure of the second (adjusting) element which is accessible via an opening through the shank (side-activated).

The insert assembly can be entirely contained within the cutting tip or provided in situ in relation to the cutting tip. The cutting tip can include a lower portion and an upper portion with the aforementioned channel being provided therebetween, e.g., spanning across the cutting tip transverse or perpendicular to a longitudinal axis of the modular drill apparatus. The expandable/retractable insert assembly includes angled surfaces which in conjunction with interfacing surfaces of the shank and a centrally disposed interface surface at the bottom of the pocket provide a simple and elegant mechanism for selectively securing or disengaging the cutting tip from the shank as further described herein. In example embodiments, the cutting tip is secured to the shank (within the pocket) by providing an interference fit. In example embodiments, the cutting tip is released or disengaged from the shank by overcoming an interference fit between the cutting tip and the shank.

An aspect of the invention is to provide a modular drill apparatus comprising: a shank including a pocket defined by a bottom and sidewalls which extend from the bottom to (and define) a distal opening of the pocket, the shank including (or being provided with) a cylindrical post centrally disposed at the bottom of the pocket, the cylindrical post including a distal end with an unlock interface; a cutting tip including a lower portion, an upper portion and a channel therebetween, the channel spanning across the cutting tip perpendicular to a longitudinal axis of the modular drill apparatus, the lower portion including a central bore which receives the cylindrical post for symmetrically supporting the cutting tip within the pocket and allowing repositioning of the cutting tip within the pocket along the longitudinal axis; and an insert assembly interfitted within (and supported by) the channel, the insert assembly being expandable/retractable along a channel axis of the channel (defined in relation to a length of the channel, e.g., transverse or perpendicular to the longitudinal axis of the modular drill apparatus), the insert assembly including chamfered (or angled) surfaces at opposite ends thereof, respectively, and a ramp (e.g., comprising a frusto-conical surface) (circumferentially disposed about a portion of the insert that is rotatable in relation to the channel). The shank includes a pair of openings therethrough at opposite sides of the shank, the openings including lock interfaces (e.g., in the form of beveled surfaces) at distal-most portions thereof (of the openings) adjacent to opposite ends of the channel, respectively, the shank and the cutting tip being shaped (and/or configured) such that when the cutting tip is received within the pocket the openings generally coalign with the channel at opposite ends thereof, respectively, one of the openings accommodating access to the insert assembly by a tool for adjustably expanding the insert assembly extending the opposite ends of the insert assembly into the openings bringing the chamfered surfaces into contact with the lock interfaces which are configured/angled such that the cutting tip and insert assembly together translate toward the bottom of the pocket (causing the sidewalls of the pocket to deform slightly radially outward) providing an interference fit between the cutting tip and the (sidewalls of the) pocket and for adjustably retracting (or compressing or shortening) the insert assembly bringing the ramp into contact with the unlock interface, the ramp and the unlock interface being configured/angled such that responsive to retracting the opposite ends of the insert the cutting tip and the insert assembly together translate/reposition a sufficient amount/distance away from the bottom of the pocket to release or disengage the cutting tip from the shank by overcoming the interference fit (between the cutting tip and the pocket). In example embodiments, the openings generally coalign with the channel at opposite ends thereof, respectively, independent of whether the (cutting tip/pocket) interference fit has been established yet provided the cutting tip is fully received within the pocket, i.e., slid or dropped into the pocket until the cutting tip is stopped by friction with the sidewalls (or by a stop surface or surfaces).

An aspect of the invention is to provide a modular drill apparatus comprising: a shank including a pocket including a bottom, the shank including (or being provided with) a cylindrical post centrally disposed at the bottom, the cylindrical post including a distal end with an unlock interface; a cutting tip including a lower portion, an upper portion and a channel therebetween, the channel spanning across the cutting tip perpendicular to a longitudinal axis of the modular drill apparatus, the lower portion including a central bore which receives the cylindrical post for symmetrically supporting the cutting tip within the pocket and allowing repositioning of the cutting tip within the pocket along the longitudinal axis; and an insert assembly interfitted within (and supported by) the channel, the insert assembly being expandable/retractable along a channel axis of the channel (defined in relation to a length of the channel, e.g., transverse to the longitudinal axis of the modular drill apparatus), the insert assembly including chamfered (or angled) surfaces at opposite ends thereof, respectively, and a ramp, the ramp and one of the chamfered (or angled) surfaces being rotationally repositionable in relation to and longitudinally slidable along the channel axis, and another of the chamfered (or angled) surfaces being rotationally fixed in position in relation to and longitudinally slidable along the channel axis. The shank includes a pair of openings therethrough at opposite sides of the shank, the openings including lock interfaces at distal-most portions thereof (of the openings) adjacent to opposite ends of the channel, respectively, the shank and the cutting tip being shaped (and/or configured) such that when the cutting tip is received within the pocket the openings generally coalign with the channel at opposite ends thereof, respectively, one of the openings accommodating access to the insert assembly by a tool for adjustably expanding the insert assembly extending the opposite ends of the insert assembly into the openings bringing the chamfered surfaces into contact with the lock interfaces which are configured/angled such that the cutting tip and insert assembly together translate toward the bottom of the pocket (causing the pocket to deform slightly radially outward facilitating/providing an interference fit between the cutting tip and the pocket) and for adjustably retracting (or compressing or shortening) the insert assembly bringing the ramp into contact with the unlock interface, the ramp and the unlock interface being configured/angled such that responsive to retracting the opposite ends of the insert assembly the cutting tip and insert assembly together translate/reposition a sufficient amount/distance away from the bottom of the pocket to release or disengage the cutting tip from the shank (by overcoming the interference fit between the cutting tip and the pocket).

An aspect of the invention is to provide a modular drill apparatus comprising: a shank including a pocket defined by a bottom and sidewalls which extend from the bottom to (and define) a distal opening of the pocket, the shank including (or being provided with) a cylindrical post centrally disposed at the bottom of the pocket; a cutting tip including a lower portion, an upper portion and a channel therebetween, the channel spanning across the cutting tip perpendicular to a longitudinal axis of the modular drill apparatus, the lower portion including a central bore which receives the cylindrical post for symmetrically supporting the cutting tip within the pocket and allowing repositioning of the cutting tip within the pocket along the longitudinal axis; and an insert assembly interfitted within (and supported by) the channel, the insert assembly being expandable along a channel axis of the channel (defined in relation to a length of the channel, e.g., transverse to the longitudinal axis of the modular drill apparatus) for securing the cutting tip to the shank (within the pocket by providing an interference fit between the cutting tip and the pocket), the insert assembly including chamfered (or angled) surfaces at opposite ends thereof and an adjusting component accessible via an opening in the shank, the adjusting component being rotationally repositionable within and longitudinally slidable along the channel by rotating the adjusting component in a first direction (e.g., counterclockwise) for repositioning, responsive to the chamfered (or angled) surfaces interfacing with portions of the shank, the cutting tip and the insert assembly toward the bottom of the pocket (causing the sidewalls of the pocket to deform slightly radially outward to provide the interference fit), and the insert assembly being retractable along the channel axis for releasing (or disengaging or unlocking) the cutting tip from the pocket, the adjusting component including a ramp circumferentially disposed thereabout and generally facing the central bore (at an intersection of the channel and the central bore), the adjusting component being rotationally repositionable in relation to and longitudinally slidable along the channel axis by counterrotating the adjusting component in a second direction (e.g., clockwise) for repositioning, responsive to the ramp interfacing with a portion of the cylindrical post (extended within the channel), the cutting tip and the insert assembly a sufficient distance away from the bottom of the pocket to (overcome the interference fit between the cutting tip and the pocket and) release (or disengage) the cutting tip from the pocket. In an example embodiment, the portions of the shank are lock interfaces adjacent to opposite ends of the channel, respectively. In an example embodiment, the lock interfaces are distal-most portions of the openings, respectively. In example embodiments, the insert assembly includes an anchoring component at an opposite end thereof from the adjusting component, the anchor component being rotationally fixed in position in relation to and longitudinally slidable along the channel axis.

An aspect of the invention is to provide a modular drill apparatus comprising: a shank having a pocket, a cylindrical post centrally secured within a bottom of the pocket, a cutting tip including a lower portion including a central bore which receives the cylindrical post, an upper portion and a channel therebetween, and an insert assembly interfitted within (and supported by) the channel, the insert assembly being expandable along a length thereof for securing the cutting tip to the shank (within the pocket) by providing an interference fit and retractable along the length thereof for releasing the cutting tip from the pocket by overcoming the interference fit.

DETAILED DESCRIPTION

Referring now to FIGS. 1-6, an example embodiment of a modular drill apparatus 100 is shown. In one aspect, the modular drill apparatus 100 illustrated herein pertains generally to drills with replaceable cutting tips (or cutting inserts). However, it should be appreciated that the technologies described herein, namely cutting tool assemblies having an expandable/retractable insert assembly configured for facilitating selectively securing/disengaging a cutting portion (e.g., a cutting tip) to/from a tool holder portion (e.g., a shank) are also generally adaptable as or in relation to cutting tool assemblies to benefit from and/or incorporate insert assemblies as further described herein.

Cutting tool assemblies, cutting tools and components thereof, such as described herein, are applicable to cutting operations and devices, such as for example: holemaking, modular drill systems and components thereof (e.g., bodies, shanks and cutting bits/inserts), modular and/or indexable drill systems and expandable cutting tools.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", is not to be limited to the precise value specified. In at least some instances, the approximating language may correspond to the precision of an instrument for measuring the value. Herein and throughout the specification and claims, range limitations may be combined and/or interchanged, such ranges are identified and include all the sub-ranges contained therein unless context or language indicates otherwise.

Figure 1:
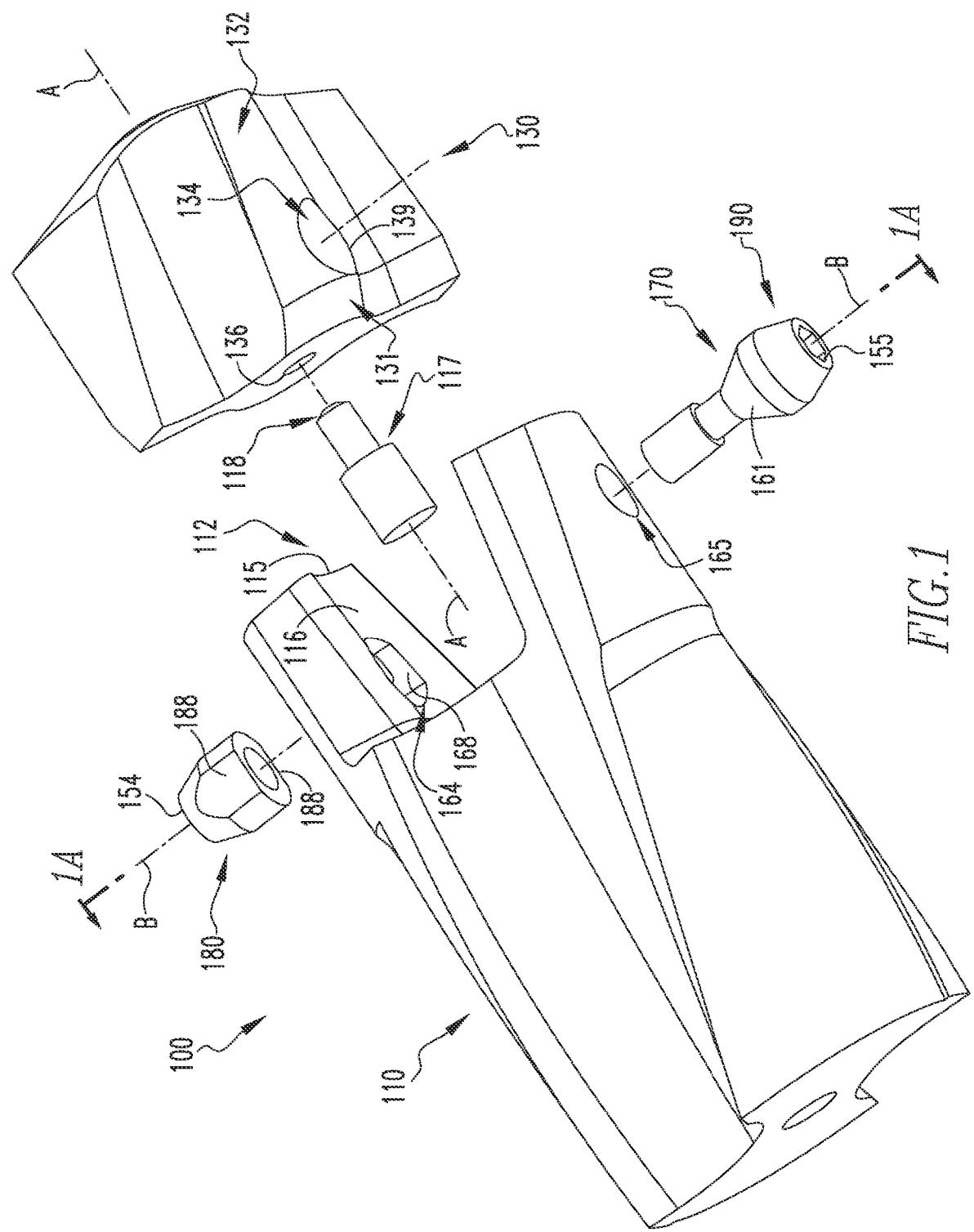
FIG. 1 is an exploded isometric perspective view of an example embodiment of a modular drill apparatus that includes a shank having a pocket, a cylindrical post centrally secured within the bottom of the pocket, a cutting tip including a lower portion, an upper portion and a channel therebetween, and an insert assembly interfitted within (and supported by) the channel, the insert assembly being expandable along a length thereof for securing the cutting tip to the shank (within the pocket) by providing an interference fit and retractable along a length thereof for releasing the cutting tip from the pocket by overcoming the interference fit.
Figure 1A:
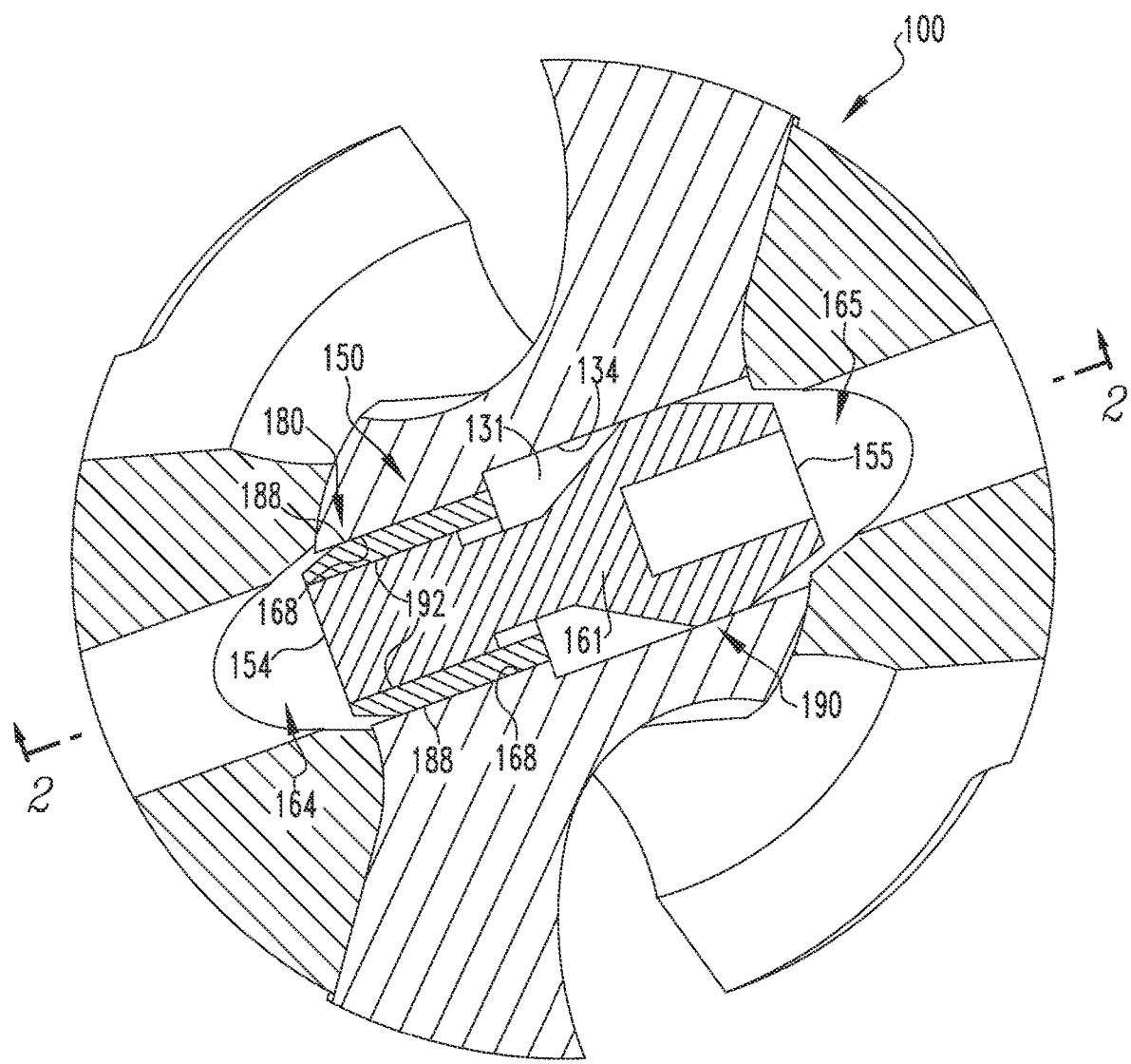
FIG. 1A is cross-sectional (not exploded) view taken through line 1A-IA of FIG. 1, showing the channel of the cutting tip and the insert assembly interfitted/supported therein, and a pair of openings at opposite sides of the shank, the openings generally coaligning with the channel at opposite ends thereof, respectively.

With reference to FIGS. 1 and 1A, in this example embodiment, the modular drill apparatus 100 includes a shank 110, a cutting tip 130 and an insert assembly 150. The shank 110 including a pocket 112 defined by a bottom 114 and sidewalls 116 which extend from the bottom 114 to a distal opening 115 of the pocket 112, the shank 110 including a cylindrical post 117 centrally disposed at the bottom 114 of the pocket 112. The cylindrical post 117 includes a distal end 118 with an unlock interface 120 (further discussed below).

The sidewalls 116 are shaped and/or configured to deform slightly radially outward with respect to the longitudinal axis A of the modular drill apparatus 100 to receive compatible (and/or complementary) portions of a cutting insert (in this example, side exterior surfaces of the cutting tip 130) via an interference fit. By way of example, the sidewalls 116 (or portions thereof) are each inclined at an angle with respect to the central longitudinal axis A, inclined away from axis A in progressing from the bottom 114 toward the distal opening 115 of the shank 110 (e.g., each sidewall having a slope of between about 1:20 and about 1:10 in respect to the longitudinal axis A of the modular drill apparatus 100). For additional examples of possible shank/cutting tip designs and their structural and operational particulars, see U.S. patent application Ser. No. 15/382,120 (Applicant: Kennametal Inc.) which is hereby incorporated by reference.

The cutting tip 130 includes a lower portion 131, an upper portion 132 and a channel 134 therebetween. In this example embodiment, the channel 134 spans (and is formed, e.g., as shown) across the cutting tip 130 perpendicular to a longitudinal axis A. The lower portion 131 includes a central bore 136 which receives the cylindrical post 117 for symmetrically supporting the cutting tip 130 within the pocket 112 and allowing repositioning of the cutting tip 130 within the pocket 112 along the longitudinal axis A.

Figure 2:
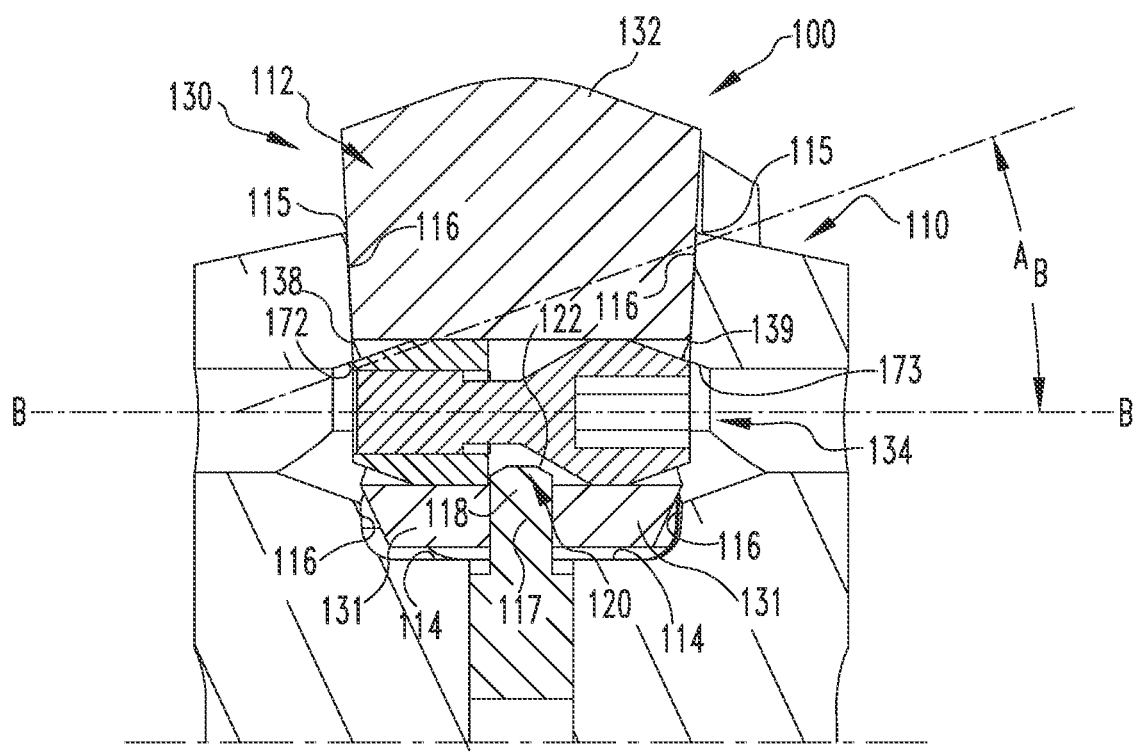
FIG. 2 is an axial section view taken through line 2-2 of FIG. 1A, showing the cutting tip positioned within the pocket and not clamped (interference fitted) between the sidewalls of the pocket, with the insert assembly being in its fully retracted configuration (not extending substantially beyond the ends of the cutting tip channel)
Figure 3:
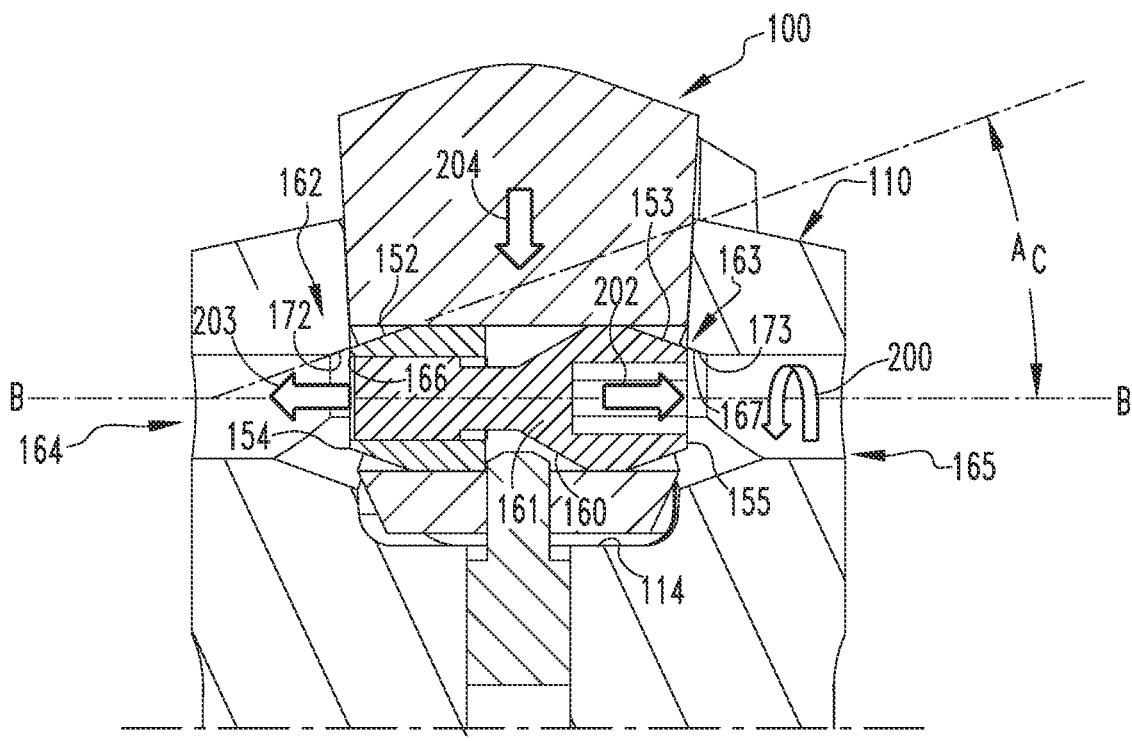
FIG. 3 is the axial section view of FIG. 2, showing a first (anchoring) component and a second (adjusting) component (of the insert assembly) which include/define a threaded interface therebetween and—for this left-hand thread example embodiment—visually depicting clockwise rotation of the adjusting component in relation to the channel responsive to which the components both reposition radially outward away from each other expanding the insert assembly along a length thereof to advance the components at opposite ends thereof into the openings at the opposite sides of the shank, respectively, for repositioning the cutting tip and the insert assembly toward the bottom of the pocket.
Figure 5:
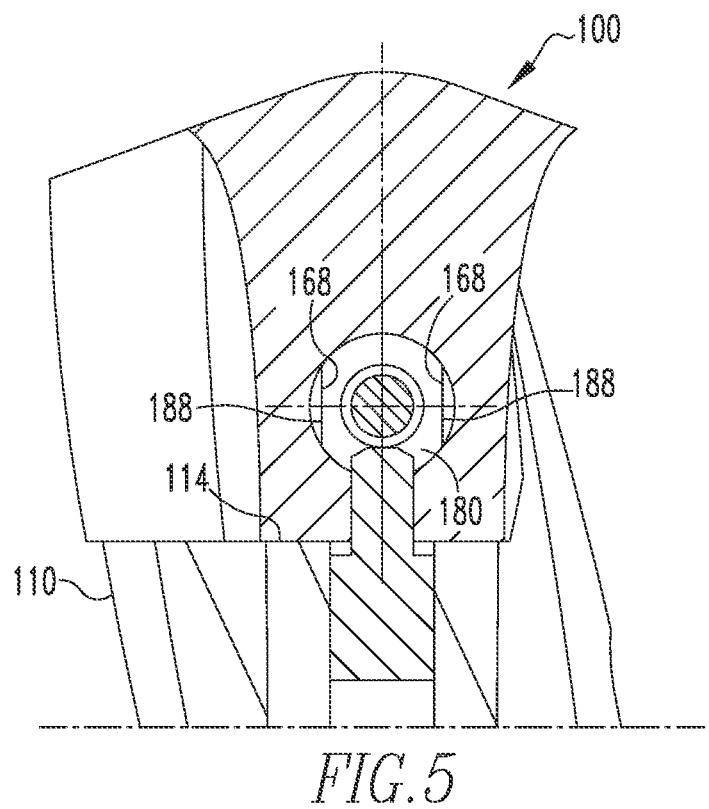
FIG. 5 is an axial section view of FIG. 4, showing the first (anchoring) component interfitted within (and supported by) complementary surfaces of the channel configured such that the first (anchoring) component is rotationally fixed in position in relation to and longitudinally slidable along the channel axis.

The insert assembly 150 includes an adjusting component 190 and an anchoring component 180 at an opposite end thereof from the adjusting component 190. With reference to FIG. 1A, the anchoring component 180 and the adjusting component 190 (of the insert assembly) include/define a threaded interface 192 therebetween. With reference also to FIGS. 2 and 3, the insert assembly 150 is interfitted within the channel 134, the insert assembly 150 being expandable/retractable along a channel axis B of the channel 134, the insert assembly 150 including chamfered surfaces 152, 153 at opposite ends 154, 155 thereof, respectively, and a ramp 160. The ramp 160 and the chamfered surface 153 (of the adjusting component 190) being rotationally repositionable in relation to and longitudinally slidable along the channel axis B, and the other chamfered surface 152 (of the anchoring component 180) being rotationally fixed in position in relation to and longitudinally slidable along the channel axis B. Referring to FIGS. 1, 1A and 5, in this example embodiment the anchoring component 180 includes rotation lock surfaces 188 (e.g., planar surfaces at opposite sides of anchoring component 180) which interface with (complementary) rotation stop interfaces/surfaces 168 of the channel 134 (of the shank 110).

In this example embodiment, the ramp 160 is between the chamfered surfaces 152, 153. In example embodiments, the ramp 160 comprises a frusto-conical surface 161 (e.g., configured/shaped as shown). In example embodiments, the ramp 160 is circumferentially disposed about a portion 170 of the insert assembly 150 that is rotatable in relation to the channel axis B.

In respect to materials, the cutting tip 130 and particularly the upper portion 132 can be made of one or more hard or super hard materials such as for example carbide (e.g., solid carbide, or provided with an outer/exterior carbide layer or other structure. The shank 110, the cylindrical post 117 and the anchoring component 180 and the adjusting component 190 (of the insert assembly 150) are formed, for example, from hardened steel.

The shank 110 includes a pair of openings 164, 165 therethrough at opposite sides of the shank 110, the openings 164, 165 including lock interfaces 162, 163 at distal-most portions 166, 167 thereof adjacent to opposite ends 138, 139 of the channel 134, respectively, the shank 110 and the cutting tip 130 being shaped such that when the cutting tip 130 is received within the pocket 112 the openings 164, 165 generally coalign with the channel 134 at the opposite ends 138, 139 thereof, respectively, independent of whether the cutting tip/pocket interference fit has been established yet provided the cutting tip 130 is fully received within the pocket 112, i.e., slid or dropped into the pocket 112 until stopped by friction with the sidewalls 116 (or by a stop surface or surfaces).

The insert assembly 150 is expandable along the channel axis B of the channel 134 for securing the cutting tip 130 to the shank 110. The adjusting component 190 is accessible via the opening 165 in the shank 110 and rotationally repositionable within and longitudinally slidable along the channel 134 by rotating the adjusting component 190 in a first direction, e.g., counterclockwise as denoted by arrow 200 (FIG. 3). The opening 165 accommodates access to the insert assembly 150 by a tool (not shown) for adjustably expanding the insert assembly 150 extending the opposite ends 154, 155 of the insert assembly 150 into the openings 164, 165 as denoted by the arrows 203 and 202, respectively (FIG. 3), bringing the chamfered surfaces 152, 153 into contact/interfacing with portions of the shank, namely, the lock interfaces 162, 163 which are configured/angled such that the cutting tip 130 and insert assembly 150 together translate toward the bottom 114 of the pocket 112 as denoted by the arrow 204 (FIG. 3).

As shown in FIG. 2, in this example embodiment, the lock interfaces 162, 163 are provided in the form of beveled surfaces 172, 173, and each of the beveled surfaces 172, 173 has/forms a bevel angle AB, e.g., between 200 and 300, in relation to the channel axis B. In an example embodiment, the bevel angle AB is around 25°. As shown in FIG. 3, in this example embodiment, each of the chamfered surfaces 152, 153 has/forms a chamfer angle $A_C$, e.g., between 20° and 30°, in relation to the channel axis B. In an example embodiment, the chamfer angle $A_C$ is around 250. In example embodiments, the lock interfaces 162, 163 and the chamfered surfaces 152, 153 are complementary in shape.

Figure 4:
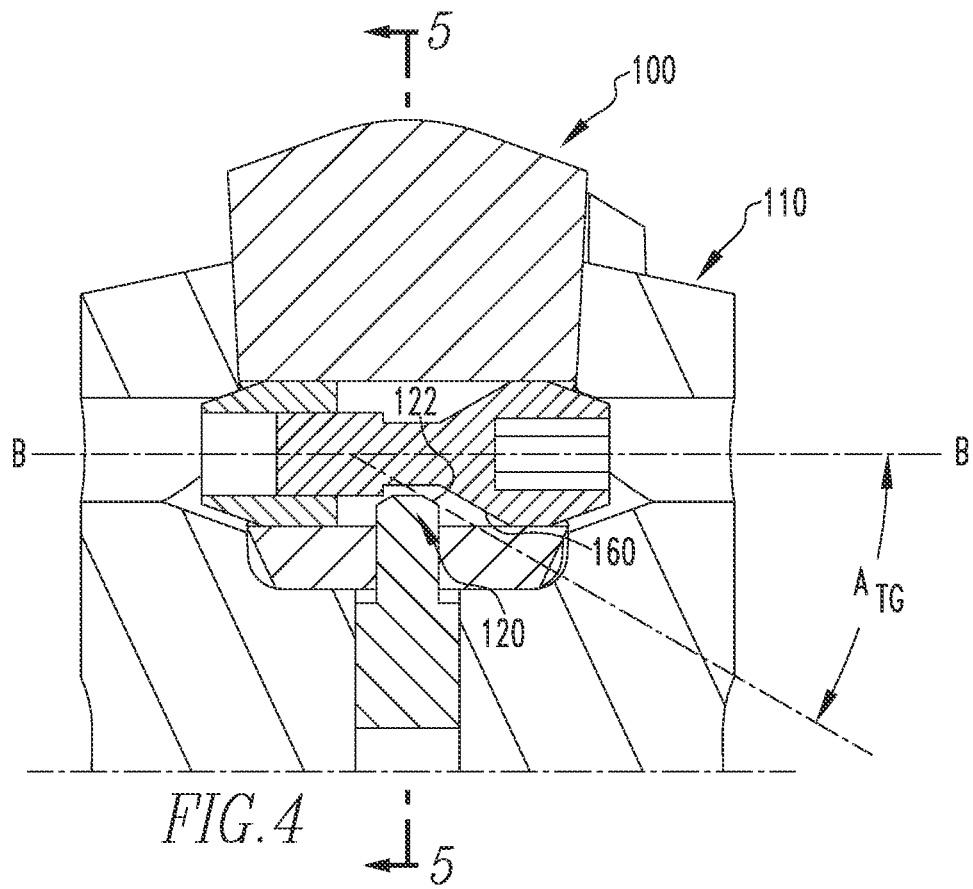
FIG. 4 is the axial section view of FIG. 2, showing the insert assembly including chamfered (or angled) surfaces at opposite ends thereof, the shank openings including lock interfaces at distal-most portions of the openings adjacent to opposite ends of the channel, respectively, and depicting the insert assembly components at opposite ends thereof advanced into the openings (at the opposite sides of the shank, respectively) and their chamfered (or angled) surfaces bearing against and being guided downward by the lock interfaces as the insert assembly is adjusted to its fully expanded configuration repositioning the cutting tip and the insert assembly toward the bottom of the pocket to an interference fit position (as shown) providing an interference fit between the cutting tip and the sidewalls of the pocket.
Figure 6:
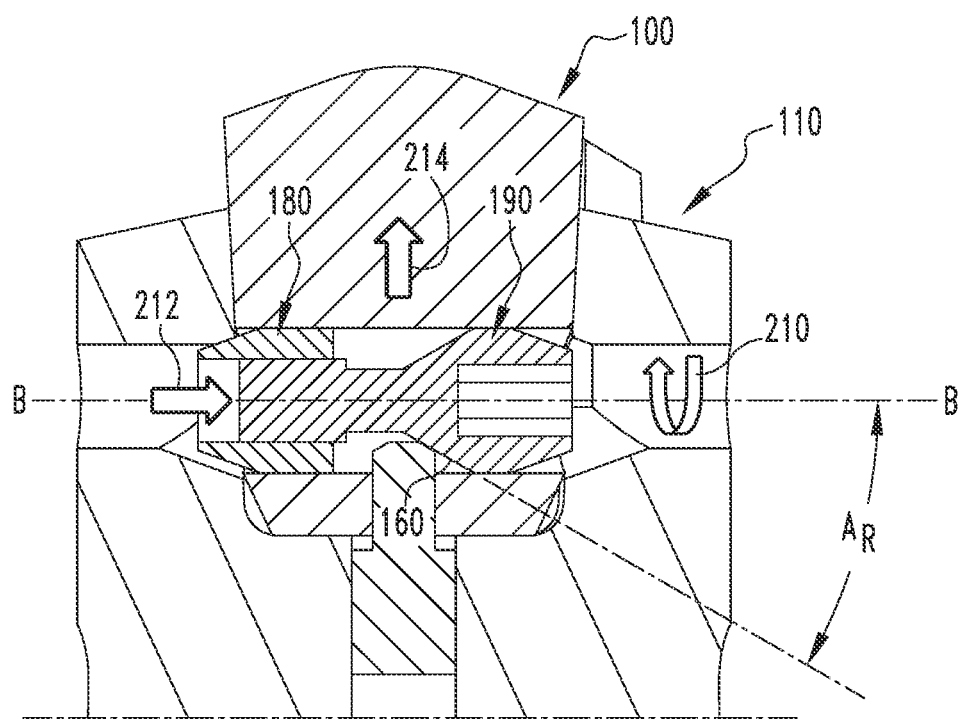
FIG. 6 is the axial section view of FIG. 2, showing an unlock interface (at the distal end of the cylindrical post) which extends into the channel, the second (adjusting) component including a ramp circumferentially disposed thereabout, the ramp being brought into contact with and guided by the unlock interface to reposition upward/distally responsive to the insert assembly being adjusted toward/to its retracted (or compressed or shortened) configuration, the unlock interface and the ramp being configured/angled such that the cutting tip and the insert assembly together translate/reposition a sufficient amount/distance away from the bottom of the pocket (as shown in FIG. 2) releasing the cutting tip by overcoming the interference fit between the cutting tip and the sidewalls of the pocket.

Referring additionally to FIGS. 4-6, the insert assembly 150 is also retractable along the channel axis B for releasing the cutting tip 130 from the pocket 112. The ramp 160 of the adjusting component 190 is circumferentially disposed thereabout and generally facing the central bore 136, and the adjusting component 190 is rotationally repositionable in relation to and longitudinally slidable along the channel axis B by counterrotating the adjusting component 190 in a second direction, e.g., clockwise as denoted by arrow 210 (FIG. 6). The opening 165 also accommodates access to the insert assembly 150 by the tool for adjustably retracting the insert assembly 150 bringing the ramp 160 into contact with the unlock interface 120, the ramp 160 and the unlock interface 120 being configured/angled such that responsive to retracting the opposite ends 154, 155 of the insert assembly 150, as denoted by the arrow 212 in respect to the inward repositioning of the anchoring component 180 (FIG. 6), the cutting tip 130 and the insert assembly 150 together translate/reposition a sufficient amount/distance away from the bottom 114 of the pocket 112 to release or disengage the cutting tip 130 from the shank 110 as denoted by the arrow 214 (FIG. 6).

As shown in FIG. 4, in this example embodiment, the unlock interface 120 includes a translation guide surface 122 that has/forms a translation guide angle $A_{TG}$, e.g., between 25° and 35°, in relation to the channel axis B. In an example embodiment, the translation guide angle $A_{TG}$ is around 30°. As shown in FIG. 6, in this example embodiment, the ramp 160 has/forms a ramp angle $A_R$, e.g., between 25° and 35°, in relation to the channel axis B. In an example embodiment, the ramp angle $A_R$ is around 30°. In example embodiments, the unlock interface 120 and the ramp 160 are complementary in shape. In example embodiments, the translation guide angle A-m is greater than or equal to the bevel angle AB. In example embodiments, the shank 110 and the insert assembly 150 are configured such that the insert assembly 150 is expandable along the channel axis B for securing the cutting tip 130 to the shank 110 within the pocket 112 by providing an interference fit between the cutting tip 130 and the pocket 112. In example embodiments, the insert assembly 150 is interfitted within and supported by the channel 134. In example embodiments, the insert assembly 150 is expandable along a length of the channel 134 for securing the cutting tip 130 to the shank 110 within the pocket 112 by providing an interference fit and retractable along the length of the channel 134 for releasing the cutting tip 130 from the pocket 112 by overcoming the interference fit.

Figure 7:
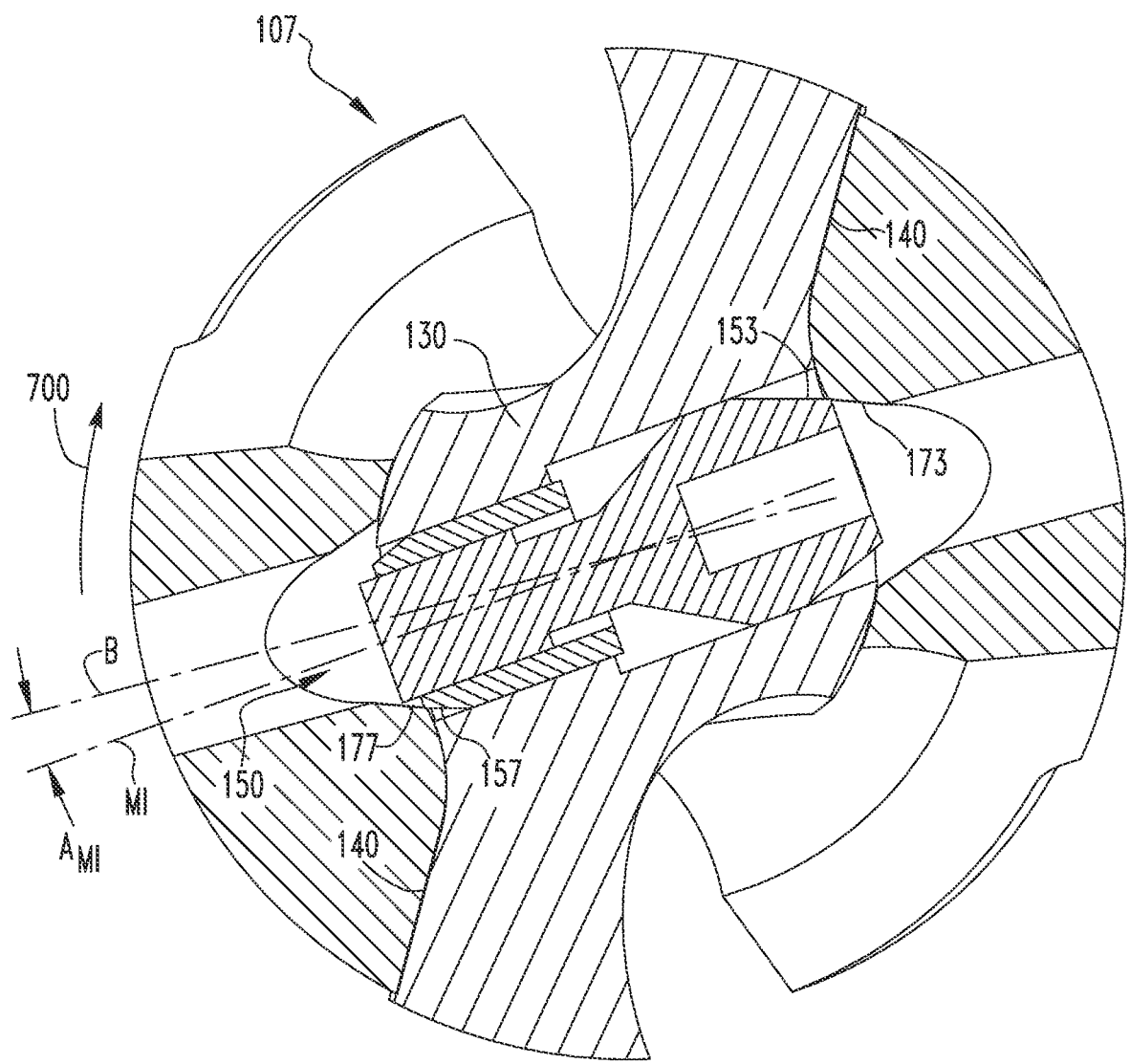
FIG. 7 is the cross-sectional view of FIG. 1A for an alternative embodiment of a modular drill apparatus configured to provide a misalignment of the channel of the cutting tip in relation to the pair of openings at opposite sides of the shank, the misalignment being provided as shown to ensure that the torque drive surfaces are first in contact with surfaces at opposite ends of the insert assembly as it is expanded along the channel axis B.

FIG. 7 shows an alternative embodiment of a modular drill apparatus 107 (which is the same of the modular drill apparatus 100 except as described otherwise herein) configured to provide a misalignment of the channel of the cutting tip in relation to the pair of openings at opposite sides of the shank, the misalignment being provided as shown to ensure that the torque drive surfaces 140 (via the beveled surfaces 177 and 173, respectively, of the shank 110) are first in contact with the chamfered surfaces 157 and 153, respectively, of the insert assembly 150 at opposite ends thereof as the insert assembly is expanded along the channel axis B forcing the cutting tip 130 to rotate clockwise as denoted by arrow 700. The angle (denoted "$A_{M1}$") between the non-misaligned channel axis (denoted "B") and the misaligned channel axis (denoted "M1") can, for example, vary between 30 and 70 (e.g., 5°). In an example embodiment, the cutting tip 130 and the shank 110 are configured with the channel of the cutting tip misaligned in relation to the pair of openings at opposite sides of the shank such that the misalignment ensures that the insert assembly 150 interferes with (engages) the torque drive surfaces 140 when the insert assembly is expanded.

Figure 8:
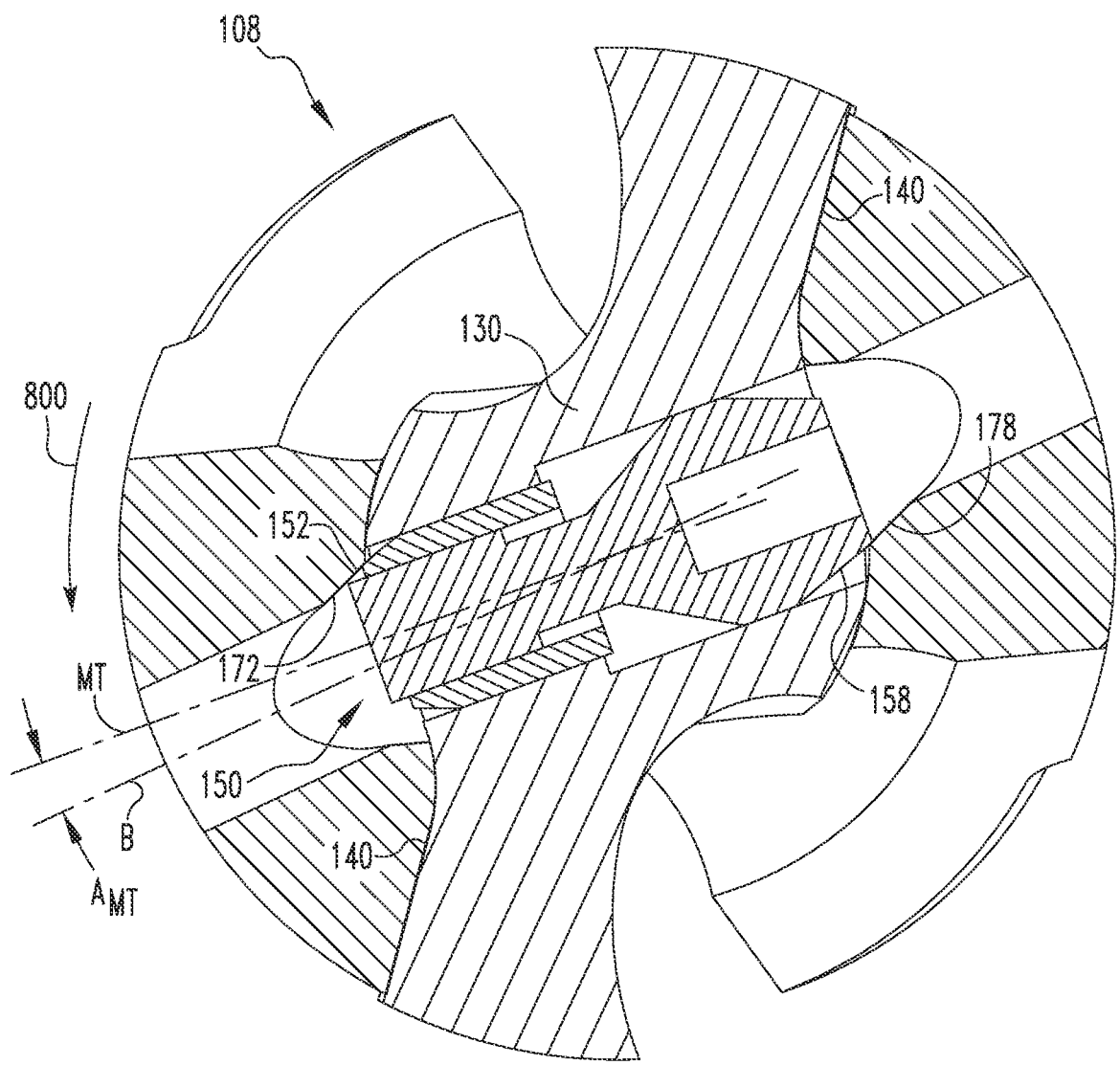
FIG. 8 is the cross-sectional view of FIG. 1A for another alternative embodiment of a modular drill apparatus configured to provide a misalignment of the channel of the cutting tip in relation to the pair of openings at opposite sides of the shank, the misalignment being provided as shown to transmit part of the torque from surfaces at opposite ends of the insert assembly to the torque drive surfaces as the insert assembly is expanded along the channel axis B.

FIG. 8 shows an alternative embodiment of a modular drill apparatus 108 (which is the same of the modular drill apparatus 100 except as described otherwise herein) configured to provide a misalignment of the channel of the cutting tip in relation to the pair of openings at opposite sides of the shank, the misalignment being provided as shown to transmit part of the torque from the chamfered surfaces 152 and 158 at opposite ends of the insert assembly 150 to the torque drive surfaces 140 (via the beveled surfaces 172 and 178, respectively, of the shank 110) as the insert assembly is expanded along the channel axis B assisting the cutting tip 130 to rotate counterclockwise as denoted by arrow 800. The angle (denoted "$A_{MT}$") between the non-misaligned channel axis (denoted "B") and the misaligned channel axis (denoted "MT") can, for example, vary between 1° and 3° (e.g., 2°). In an example embodiment, the cutting tip 130 and the shank 110 are configured with the channel of the cutting tip misaligned in relation to the pair of openings at opposite sides of the shank such that the misalignment ensures that the insert assembly 150 assists (transmitting torque to) the torque drive surfaces 140 when the insert assembly is expanded.

Figure 9:
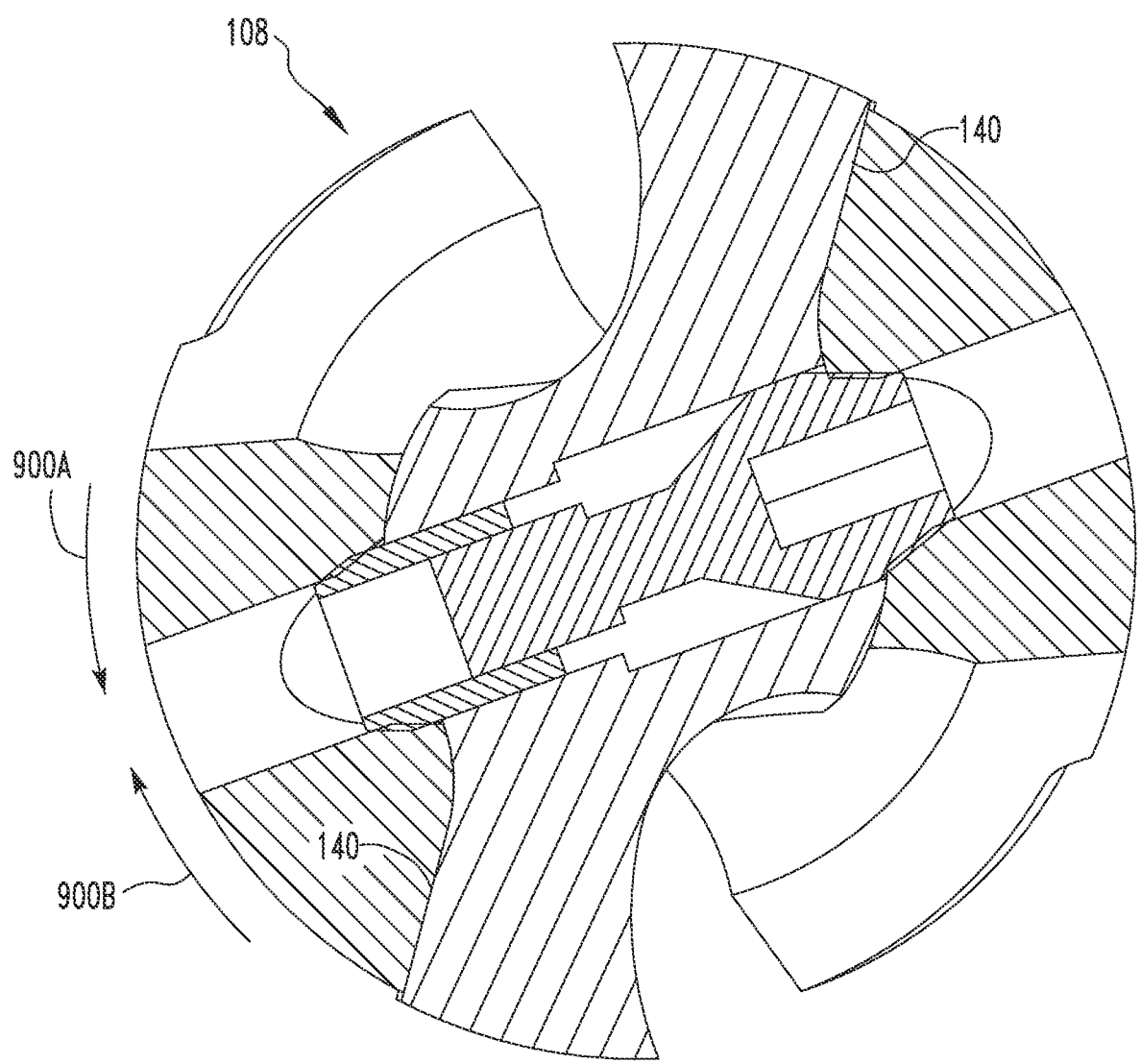
FIG. 9 provides a pictorial representation (for the modular drill apparatus of FIG. 8) of the opposing forces of torque due to misalignment and torque due to cutting forces.

FIG. 9 provides a pictorial representation (for the modular drill apparatus of FIG. 8) of the opposing forces of torque due to misalignment and torque due to cutting forces denoted by the arrow 900A and the arrow 900B, respectively. The torque due to misalignment partially cancels torque due to cutting forces.

Thus, in an example embodiment, a modular drill apparatus includes: a shank including a pocket defined by a bottom and sidewalls which extend from the bottom to (and define) a distal opening of the pocket, the shank including (or being provided with) a cylindrical post centrally disposed at the bottom of the pocket, the cylindrical post including a distal end with an unlock interface; a cutting tip including a lower portion, an upper portion and a channel therebetween, the channel spanning across the cutting tip perpendicular to a longitudinal axis of the modular drill apparatus, the lower portion including a central bore which receives the cylindrical post for symmetrically supporting the cutting tip within the pocket and allowing repositioning of the cutting tip within the pocket along the longitudinal axis; and an insert assembly interfitted within (and supported by) the channel, the insert assembly being expandable/retractable along a channel axis of the channel (defined in relation to a length of the channel, e.g., transverse or perpendicular to the longitudinal axis of the modular drill apparatus), the insert assembly including chamfered (or angled) surfaces at opposite ends thereof, respectively, and a ramp (e.g., comprising a frusto-conical surface) (circumferentially disposed about a portion of the insert that is rotatable in relation to the channel). The shank includes a pair of openings therethrough at opposite sides of the shank, the openings including lock interfaces (e.g., in the form of beveled surfaces) at distal-most portions thereof (of the openings) adjacent to opposite ends of the channel, respectively, the shank and the cutting tip being shaped (and/or configured) such that when the cutting tip is received within the pocket the openings generally coalign with the channel at opposite ends thereof, respectively, one of the openings accommodating access to the insert assembly by a tool for adjustably expanding the insert assembly extending the opposite ends of the insert assembly into the openings bringing the chamfered surfaces into contact with the lock interfaces which are configured/angled such that the cutting tip and insert assembly together translate toward the bottom of the pocket (causing the sidewalls of the pocket to deform slightly radially outward) providing an interference fit between the cutting tip and the (sidewalls of the) pocket and for adjustably retracting (or compressing or shortening) the insert assembly bringing the ramp into contact with the unlock interface, the ramp and the unlock interface being configured/angled such that responsive to retracting the opposite ends of the insert the cutting tip and the insert assembly together translate/reposition a sufficient amount/distance away from the bottom of the pocket to release or disengage the cutting tip from the shank by overcoming the interference fit (between the cutting tip and the pocket). In example embodiments, the openings generally coalign with the channel at opposite ends thereof, respectively, independent of whether the (cutting tip/pocket) interference fit has been established yet provided the cutting tip is fully received within the pocket, i.e., slid or dropped into the pocket until the cutting tip is stopped by friction with the sidewalls (or by a stop surface or surfaces).

Thus, in an example embodiment, a modular drill apparatus includes: a shank including a pocket including a bottom, the shank including (or being provided with) a cylindrical post centrally disposed at the bottom, the cylindrical post including a distal end with an unlock interface; a cutting tip including a lower portion, an upper portion and a channel therebetween, the channel spanning across the cutting tip perpendicular to a longitudinal axis of the modular drill apparatus, the lower portion including a central bore which receives the cylindrical post for symmetrically supporting the cutting tip within the pocket and allowing repositioning of the cutting tip within the pocket along the longitudinal axis; and an insert assembly interfitted within (and supported by) the channel, the insert assembly being expandable/retractable along a channel axis of the channel (defined in relation to a length of the channel, e.g., transverse to the longitudinal axis of the modular drill apparatus), the insert assembly including chamfered (or angled) surfaces at opposite ends thereof, respectively, and a ramp, the ramp and one of the chamfered (or angled) surfaces being rotationally repositionable in relation to and longitudinally slidable along the channel axis, and another of the chamfered (or angled) surfaces being rotationally fixed in position in relation to and longitudinally slidable along the channel axis. The shank includes a pair of openings therethrough at opposite sides of the shank, the openings including lock interfaces at distal-most portions thereof (of the openings) adjacent to opposite ends of the channel, respectively, the shank and the cutting tip being shaped (and/or configured) such that when the cutting tip is received within the pocket the openings generally coalign with the channel at opposite ends thereof, respectively, one of the openings accommodating access to the insert assembly by a tool for adjustably expanding the insert assembly extending the opposite ends of the insert assembly into the openings bringing the chamfered surfaces into contact with the lock interfaces which are configured/angled such that the cutting tip and insert assembly together translate toward the bottom of the pocket (causing the pocket to deform slightly radially outward facilitating/providing an interference fit between the cutting tip and the pocket) and for adjustably retracting (or compressing or shortening) the insert assembly bringing the ramp into contact with the unlock interface, the ramp and the unlock interface being configured/angled such that responsive to retracting the opposite ends of the insert assembly the cutting tip and insert assembly together translate/reposition a sufficient amount/distance away from the bottom of the pocket to release or disengage the cutting tip from the shank (by overcoming the interference fit between the cutting tip and the pocket).

Thus, in an example embodiment, a modular drill apparatus includes: a shank including a pocket defined by a bottom and sidewalls which extend from the bottom to (and define) a distal opening of the pocket, the shank including (or being provided with) a cylindrical post centrally disposed at the bottom of the pocket; a cutting tip including a lower portion, an upper portion and a channel therebetween, the channel spanning across the cutting tip perpendicular to a longitudinal axis of the modular drill apparatus, the lower portion including a central bore which receives the cylindrical post for symmetrically supporting the cutting tip within the pocket and allowing repositioning of the cutting tip within the pocket along the longitudinal axis; and an insert assembly interfitted within (and supported by) the channel, the insert assembly being expandable along a channel axis of the channel (defined in relation to a length of the channel, e.g., transverse to the longitudinal axis of the modular drill apparatus) for securing the cutting tip to the shank (within the pocket by providing an interference fit between the cutting tip and the pocket), the insert assembly including chamfered (or angled) surfaces at opposite ends thereof and an adjusting component accessible via an opening in the shank, the adjusting component being rotationally repositionable within and longitudinally slidable along the channel by rotating the adjusting component in a first direction (e.g., counterclockwise) for repositioning, responsive to the chamfered (or angled) surfaces interfacing with portions of the shank, the cutting tip and the insert assembly toward the bottom of the pocket (causing the sidewalls of the pocket to deform slightly radially outward to provide the interference fit), and the insert assembly being retractable along the channel axis for releasing (or disengaging or unlocking) the cutting tip from the pocket, the adjusting component including a ramp circumferentially disposed thereabout and generally facing the central bore (at an intersection of the channel and the central bore), the adjusting component being rotationally repositionable in relation to and longitudinally slidable along the channel axis by counterrotating the adjusting component in a second direction (e.g., clockwise) for repositioning, responsive to the ramp interfacing with a portion of the cylindrical post (extended within the channel), the cutting tip and the insert assembly a sufficient distance away from the bottom of the pocket to (overcome the interference fit between the cutting tip and the pocket and) release (or disengage) the cutting tip from the pocket. In an example embodiment, the portions of the shank are lock interfaces adjacent to opposite ends of the channel, respectively. In an example embodiment, the lock interfaces are distal-most portions of the openings, respectively. In example embodiments, the insert assembly includes an anchoring component at an opposite end thereof from the adjusting component, the anchor component being rotationally fixed in position in relation to and longitudinally slidable along the channel axis.

Thus, in an example embodiment, a modular drill apparatus includes: a shank having a pocket, a cylindrical post centrally secured within a bottom of the pocket, a cutting tip including a lower portion including a central bore which receives the cylindrical post, an upper portion and a channel therebetween, and an insert assembly interfitted within (and supported by) the channel, the insert assembly being expandable along a length thereof for securing the cutting tip to the shank (within the pocket) by providing an interference fit and retractable along the length thereof for releasing the cutting tip from the pocket by overcoming the interference fit. In an example embodiment, the cutting tip and the shank are configured with the channel of the cutting tip misaligned in relation to a pair of openings at opposite sides of the shank such that the misalignment ensures that the insert assembly interferes with (engages) the torque drive surfaces when the insert assembly is expanded. In an example embodiment, the cutting tip and the shank are configured with the channel of the cutting tip misaligned in relation to a pair of openings at opposite sides of the shank such that the misalignment ensures that the insert assembly assists (transmitting torque to) torque drive surfaces of the cutting tip when the insert assembly is expanded.

While example embodiments have been described herein, it should be apparent, however, that various modifications, alterations and adaptations to those embodiments may occur to persons skilled in the art with the attainment of some or all of the advantages of the subject matter described herein. The disclosed embodiments are therefore intended to include all such modifications, alterations and adaptations without departing from the scope and spirit of the technologies and methodologies as described herein.

What is claimed is:

1. A modular drill apparatus comprising:
a shank including a pocket defined by a bottom and sidewalls which extend from the bottom to a distal opening of the pocket, the shank including a cylindrical post centrally disposed at the bottom of the pocket, the cylindrical post including a distal end with an unlock interface, a cutting tip including a lower portion, an upper portion and a channel therebetween, the channel spanning across the cutting tip perpendicular to a longitudinal axis of the modular drill apparatus, the lower portion including a central bore which receives the cylindrical post for symmetrically supporting the cutting tip within the pocket and allowing repositioning of the cutting tip within the pocket along the longitudinal axis; and an insert assembly interfitted within the channel, the insert assembly being expandable/retractable along a channel axis of the channel, the insert assembly including chamfered surfaces at opposite ends thereof, respectively, and a ramp;

wherein the shank includes a pair of openings therethrough at opposite sides of the shank, the openings including lock interfaces at distal-most portions thereof adjacent to opposite ends of the channel, respectively, the shank and the cutting tip being shaped such that when the cutting tip is received within the pocket the openings generally coalign with the channel at the opposite ends thereof, respectively, one of the openings accommodating access to the insert assembly by a tool for adjustably expanding the insert assembly extending the opposite ends of the insert assembly into the openings bringing the chamfered surfaces into contact with the lock interfaces which are configured/angled such that the cutting tip and insert assembly together translate toward the bottom of the pocket providing an interference fit between the cutting tip and the sidewalls and for adjustably retracting the insert assembly bringing the ramp into contact with the unlock interface, the ramp and the unlock interface being configured/angled such that responsive to retracting the opposite ends of the insert assembly the cutting tip and insert assembly together translate/reposition a sufficient amount/distance away from the bottom of the pocket to release or disengage the cutting tip from the shank by overcoming the interference fit between the cutting tip and the sidewalls.

2. The modular drill apparatus of claim 1, wherein the openings generally coalign with the channel at opposite ends thereof, respectively, independent of whether the cutting tip/pocket interference fit has been established yet provided the cutting tip is fully received within the pocket, slid or dropped into the pocket until stopped by friction with the sidewalls.

3. The modular drill apparatus of claim 1, wherein the unlock interface includes a translation guide surface that has/forms a translation guide angle between 25° and 35° in relation to the channel axis.

4. The modular drill apparatus of claim 1, wherein the unlock interface includes a translation guide surface that has/forms a translation guide angle of around 30° in relation to the channel axis.

5. The modular drill apparatus of claim 1, wherein the ramp and one of the chamfered surfaces are rotationally repositionable in relation to and longitudinally slidable along the channel axis, and another of the chamfered surfaces is rotationally fixed in position in relation to and longitudinally slidable along the channel axis.

6. The modular drill apparatus of claim 1, wherein the ramp is between the chamfered surfaces.

7. The modular drill apparatus of claim 1, wherein the ramp comprises a frusto-conical surface.

8. The modular drill apparatus of claim 1, wherein the ramp is circumferentially disposed about a portion of the insert assembly that is rotatable in relation to the channel axis.

9. The modular drill apparatus of claim 1, wherein the ramp has/forms a ramp angle between 25° and 35° in relation to the channel axis.

10. The modular drill apparatus of claim 1, wherein the ramp has/forms a ramp angle of around 30° in relation to the channel axis.

11. The modular drill apparatus of claim 1, wherein the lock interfaces are provided in the form of beveled surfaces.

12. The modular drill apparatus of claim 11, wherein each of the beveled surfaces has/forms a bevel angle between 20° and 30° in relation to the channel axis.

13. The modular drill apparatus of claim 11, wherein each of the beveled surfaces has/forms a bevel angle of around 25° in relation to the channel axis.

14. The modular drill apparatus of claim 1, wherein each of the chamfered surfaces has/forms a chamfer angle between 20° and 30° relation to the channel axis.

15. The modular drill apparatus of claim 1, wherein each of the chamfered surfaces has/forms a chamfer angle of around 25° in relation to the channel axis.

16. The modular drill apparatus of claim 1, wherein the unlock interface includes a translation guide surface that has/forms a translation guide angle in relation to the channel axis, the lock interfaces are provided in the form of beveled surfaces, each of the beveled surfaces has/forms a bevel angle in relation to the channel axis, and the translation guide angle is greater than or equal to the bevel angle.

17. The modular drill apparatus of claim 1, wherein the lock interfaces and the chamfered surfaces are complementary in shape.

18. The modular drill apparatus of claim 1, wherein the unlock interface and the ramp are complementary in shape.

19. A modular drill apparatus comprising:
a shank including a pocket including a bottom, the shank including a cylindrical post centrally disposed at the bottom of the pocket, the cylindrical post including a distal end with an unlock interface;

a cutting tip including a lower portion, an upper portion and a channel therebetween, the channel spanning across the cutting tip perpendicular to a longitudinal axis of the modular drill apparatus, the lower portion including a central bore which receives the cylindrical post for symmetrically supporting the cutting tip within the pocket and allowing repositioning of the cutting tip within the pocket along the longitudinal axis; and an insert assembly interfitted within the channel, the insert assembly being expandable/retractable along a channel axis of the channel, the insert assembly including chamfered surfaces at opposite ends thereof, respectively, and a ramp, the ramp and one of the chamfered surfaces being rotationally repositionable in relation to and longitudinally slidable along the channel axis, and another of the chamfered surfaces being rotationally fixed in position in relation to and longitudinally slidable along the channel axis;

wherein the shank includes a pair of openings therethrough at opposite sides of the shank, the openings including lock interfaces at distal-most portions thereof adjacent to opposite ends of the channel, respectively, the shank and the cutting tip being shaped such that when the cutting tip is received within the pocket the openings generally coalign with the channel at opposite ends thereof, respectively, one of the openings accommodating access to the insert assembly by a tool for adjustably expanding the insert assembly extending the opposite ends of the insert assembly into the openings bringing the chamfered surfaces into contact with the lock interfaces which are configured/angled such that the cutting tip and insert assembly together translate toward the bottom of the pocket and for adjustably retracting the insert assembly bringing the ramp into contact with the unlock interface, the ramp and the unlock interface being configured/angled such that responsive to retracting the opposite ends of the insert assembly the cutting tip and insert assembly together translate/reposition a sufficient amount/distance away from the bottom of the pocket to release or disengage the cutting tip from the shank.

20. A modular drill apparatus comprising:
a shank including a pocket defined by a bottom and sidewalls which extend from the bottom to a distal opening of the pocket, the shank including a cylindrical post centrally disposed at the bottom of the pocket;
a cutting tip including a lower portion, an upper portion and a channel therebetween, the channel spanning across the cutting tip perpendicular to a longitudinal axis of the modular drill apparatus, the lower portion including a central bore which receives the cylindrical post for symmetrically supporting the cutting tip within the pocket and allowing repositioning of the cutting tip within the pocket along the longitudinal axis; and
an insert assembly interfitted within the channel,
the insert assembly being expandable along a channel axis of the channel for securing the cutting tip to the shank, the insert assembly including chamfered surfaces at opposite ends thereof and an adjusting component accessible via an opening in the shank, the adjusting component being rotationally repositionable within and longitudinally slidable along the channel by rotating the adjusting component in a first direction for repositioning, responsive to the chamfered surfaces interfacing with portions of the shank, the cutting tip and the insert assembly toward the bottom of the pocket, and the insert assembly being retractable along the channel axis for releasing the cutting tip from the pocket, the adjusting component including a ramp circumferentially disposed thereabout and generally facing the central bore, the adjusting component being rotationally repositionable in relation to and longitudinally slidable along the channel axis by counterrotating the adjusting component in a second direction for repositioning, responsive to the ramp interfacing with a portion of the cylindrical post, the cutting tip and the insert assembly a sufficient distance away from the bottom of the pocket to release the cutting tip from the pocket.

21. The modular drill apparatus of claim 20, wherein the portions of the shank are lock interfaces adjacent to opposite ends of the channel, respectively.

22. The modular drill apparatus of claim 20, wherein the insert assembly includes an anchoring component at an opposite end thereof from the adjusting component, the anchoring component being rotationally fixed in relation to and longitudinally slidable along the channel axis.

23. The modular drill apparatus of claim 20, the shank and the insert assembly are configured such that the insert assembly is expandable along the channel axis for securing the cutting tip to the shank within the pocket by providing an interference fit between the cutting tip and the pocket.

24. A modular drill apparatus comprising:
a shank having a pocket;
a cylindrical post centrally secured within a bottom of the pocket;
a cutting tip including
a lower portion including a central bore which receives the cylindrical post,
an upper portion and
a channel therebetween; and
an insert assembly interfitted within and supported by the channel, the insert assembly being expandable along a length thereof to translate the cutting tip and the insert assembly toward the bottom of the pocket for securing the cutting tip to the shank within the pocket by providing an interference fit, and retractable along the length to bring the insert assembly into contact with the cylindrical post and release the cutting tip from the pocket by repositioning the cutting tip and the insert assembly a sufficient distance away from the bottom of the pocket and overcoming the interference fit.

25. The modular drill apparatus of claim 24, wherein the cutting tip and the shank are configured with the channel of the cutting tip misaligned in relation to a pair of openings at opposite sides of the shank such that the misalignment ensures that the insert assembly interferes with torque drive surfaces of the cutting tip when the insert assembly is expanded.

26. The modular drill apparatus of claim 24, wherein the cutting tip and the shank are configured with the channel of the cutting tip misaligned in relation to a pair of openings at opposite sides of the shank such that the misalignment ensures that the insert assembly assists torque drive surfaces of the cutting tip when the insert assembly is expanded.

27. A modular drill apparatus comprising:
a shank having a pocket defined by a bottom and sidewalls which extend from the bottom, wherein each sidewall is inclined at an angle with respect to a central longitudinal axis of the shank;
a cylindrical post centrally secured within the bottom of the pocket;
a cutting tip including
a lower portion including a central bore which receives the cylindrical post,
an upper portion and
a channel therebetween; and
an insert assembly interfitted within and supported by the channel, the insert assembly being expandable along a length thereof for securing the cutting tip to the shank within the pocket by providing an interference fit and retractable along the length thereof to bring the insert assembly into contact with the cylindrical post and release the cutting tip from the pocket by overcoming the interference fit.

* * * * *